United States Patent
Carlough et al.

(10) Patent No.: US 10,120,683 B2
(45) Date of Patent: Nov. 6, 2018

(54) SUPPORTING EVEN INSTRUCTION TAG ('ITAG') REQUIREMENTS IN A MULTI-SLICE PROCESSOR USING NULL INTERNAL OPERATIONS (IOPS)

(71) Applicant: International Business Machines Corporation, Armonk, NY (US)

(72) Inventors: Steven R. Carlough, Poughkeepsie, NY (US); Kurt A. Feiste, Austin, TX (US); Paul M. Kennedy, Austin, TX (US); Phillip G. Williams, Leander, TX (US)

(73) Assignee: International Business Machines Corporation, Armonk, NY (US)

( * ) Notice: Subject to any disclaimer, the term of this patent is extended or adjusted under 35 U.S.C. 154(b) by 197 days.

(21) Appl. No.: 15/139,430

(22) Filed: Apr. 27, 2016

(65) Prior Publication Data

US 2017/0315809 A1 Nov. 2, 2017

(51) Int. Cl.
| | |
|---|---|
| *G06F 15/00* | (2006.01) |
| *G06F 9/30* | (2018.01) |
| *G06F 9/40* | (2006.01) |
| *G06F 13/42* | (2006.01) |
| *G06F 13/40* | (2006.01) |
| *G06F 9/38* | (2018.01) |
| *G06F 15/80* | (2006.01) |

(52) U.S. Cl.
CPC ........ *G06F 9/30036* (2013.01); *G06F 9/3001* (2013.01); *G06F 9/3832* (2013.01); *G06F 13/4068* (2013.01); *G06F 13/4282* (2013.01); *G06F 15/8069* (2013.01)

(58) Field of Classification Search
None
See application file for complete search history.

(56) References Cited

U.S. PATENT DOCUMENTS

| | | | | |
|---|---|---|---|---|
| 7,613,912 | B2 | 11/2009 | Erb | |
| 2004/0044878 | A1* | 3/2004 | Evans | G06F 9/3842 712/34 |
| 2004/0268097 | A1* | 12/2004 | Mericas | G06F 9/3017 712/227 |
| 2006/0095730 | A1* | 5/2006 | Wolrich | G06F 9/3802 712/215 |
| 2006/0179277 | A1 | 8/2006 | Flachs et al. | |
| 2007/0288729 | A1* | 12/2007 | Erb | G06F 8/445 712/234 |

FOREIGN PATENT DOCUMENTS

WO    WO 2006/039183 A2    4/2006

* cited by examiner

*Primary Examiner* — George Giroux
(74) *Attorney, Agent, or Firm* — Joseph D. Downing; Nathan M. Rau; Kennedy Lenart Spraggins LLP

(57) ABSTRACT

Supporting even instruction tag ('ITAG') requirements in a multi-slice processor with null internal operations (IOPs) includes: receiving an IOP with an even ITAG requirement; determining that the IOP is to be assigned an odd ITAG; and inserting a null IOP into an instruction lane ahead of the IOP, wherein the null IOP is assigned the odd ITAG, and the IOP is assigned an even ITAG.

20 Claims, 6 Drawing Sheets

SUPPORTING EVEN INSTRUCTION TAG ('ITAG') REQUIREMENTS IN A MULTI-SLICE PROCESSOR USING NULL INTERNAL OPERATIONS (IOPS)

BACKGROUND

Field of the Invention

The field of the invention is data processing, or, more specifically, methods, apparatus, and products for supporting even instruction tag ('ITAG') requirements in a multi-slice processor using null internal operations (IOPs).

Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

One area of computer system technology that has advanced is computer processors. As the number of computer systems in data centers and the number of mobile computing devices has increased, the need for more efficient computer processors has also increased. Speed of operation and power consumption are just two areas of computer processor technology that affect efficiency of computer processors.

SUMMARY

Methods and apparatus for supporting even instruction tag ('ITAG') requirements in a multi-slice processor using null internal operations (IOPs) are disclosed in this application. Using null IOPs to support even ITAG requirements in a multi-slice processor includes receiving an IOP with an even ITAG requirement, wherein the IOP is grouped with a companion IOP, and the IOP is received before the companion IOP; determining that the IOP is to be assigned an odd ITAG; and inserting a null IOP into an instruction lane ahead of the IOP, wherein the null IOP is assigned the odd ITAG, and the IOP is assigned an even ITAG.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION

Figure 1:
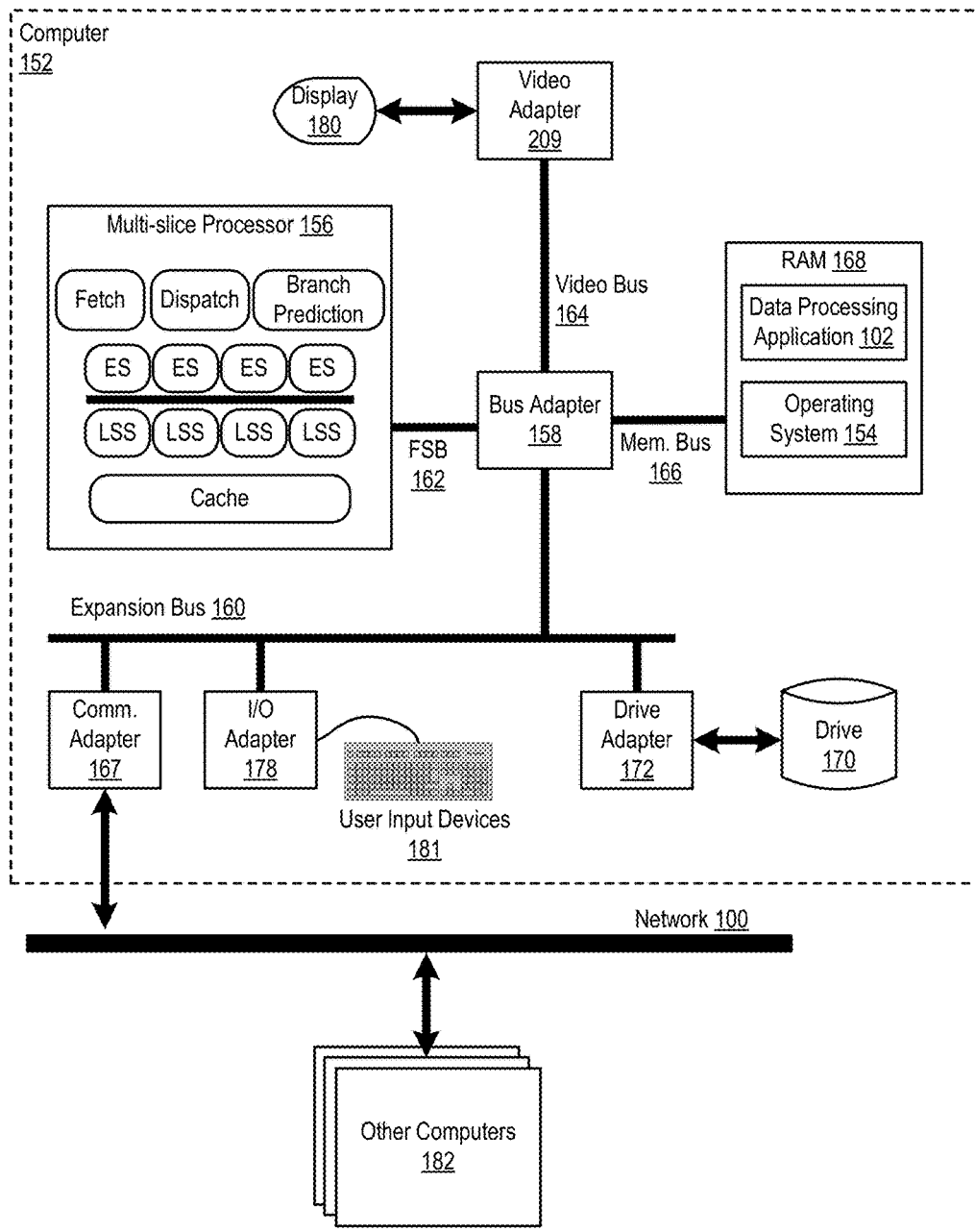
FIG. 1 sets forth an example system configured for supporting even instruction tag ('ITAG') requirements in a multi-slice processor using null internal operations (IOPs).

Exemplary methods, apparatus, and products for supporting even instruction tag ('ITAG') requirements in a multi-slice processor using null internal operations (IOPs) in accordance with the present invention are described with reference to the accompanying drawings, beginning with FIG. 1. FIG. 1 sets forth a network diagram of a system configured for using null IOPs to support even ITAG requirements in a multi-slice processor according to embodiments of the present invention. The system of FIG. 1 includes an example of automated computing machinery in the form of a computer (152).

The computer (152) of FIG. 1 includes at least one computer processor (156) or 'CPU' as well as random access memory (168) ('RAM') which is connected through a high speed memory bus (166) and bus adapter (158) to processor (156) and to other components of the computer (152).

The example computer processor (156) of FIG. 1 may be implemented as a multi-slice processor. The term 'multi-slice' as used in this specification refers to a processor having a plurality of similar or identical sets of components, where each set may operate independently of all the other sets or in concert with the one or more of the other sets. The multi-slice processor (156) of FIG. 1, for example, includes several execution slices ('ES') and several load/store slices ('LSS'). Each execution slice may be configured to provide components that support execution of instructions: an issue queue, a general purpose register (GPR), a history buffer, an arithmetic logic unit (212) (including a vector scalar unit, a floating point unit, and others), and the like. Each of the load/store slices may be configured with components that support data movement operations such as loading of data from cache or memory or storing data in cache or memory. In some embodiments, each of the load/store slices includes a data cache. The load/store slices are coupled to the execution slices through a results bus. In some embodiments, each execution slice may be associated with a single load/store slice to form a single processor slice. In some embodiments, multiple processor slices may be configured to operate together.

The example multi-slice processor (156) of FIG. 1 may also include, in addition to the execution and load/store slices, other processor components. In the system of FIG. 1, the multi-slice processor (156) includes fetch logic, dispatch logic, and branch prediction logic. Further, although in some embodiments each load/store slice includes cache memory, the multi-slice processor (156) may also include cache accessible by any or all of the processor slices.

Although the multi-slice processor (156) in the example of FIG. 1 is shown to be coupled to RAM (168) through a front side bus (162), a bus adapter (158) and a high speed memory bus (166), readers of skill in the art will recognize that such configuration is only an example implementation. In fact, the multi-slice processor (156) may be coupled to other components of a computer system in a variety of configurations. For example, the multi-slice processor (156) in some embodiments may include a memory controller configured for direct coupling to a memory bus (166). In some embodiments, the multi-slice processor (156) may support direct peripheral connections, such as PCIe connections and the like.

Stored in RAM (168) in the example computer (152) is a data processing application (102), a module of computer program instructions that when executed by the multi-slice processor (156) may provide any number of data processing tasks. Examples of such data processing applications may include a word processing application, a spreadsheet application, a database management application, a media library application, a web server application, and so on as will occur to readers of skill in the art. Also stored in RAM (168) is an operating system (154). Operating systems useful in computers configured for operation of a multi-slice processor according to embodiments of the present invention include UNIX™, Linux™, Microsoft Windows™, AIX™, IBM's z/OS™, and others as will occur to those of skill in the art. The operating system (154) and data processing application (102) in the example of FIG. 1 are shown in RAM (168), but many components of such software typically are stored in non-volatile memory also, such as, for example, on a disk drive (170).

The computer (152) of FIG. 1 includes disk drive adapter (172) coupled through expansion bus (160) and bus adapter (158) to processor (156) and other components of the computer (152). Disk drive adapter (172) connects non-volatile data storage to the computer (152) in the form of disk drive (170). Disk drive adapters useful in computers configured for operation of a multi-slice processor according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example computer (152) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example computer (152) of FIG. 1 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The exemplary computer (152) of FIG. 1 includes a communications adapter (167) for data communications with other computers (182) and for data communications with a data communications network (100). Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful in computers configured for operation of a multi-slice processor according to embodiments of the present invention include modems for wired dial-up communications, Ethernet (IEEE 802.3) adapters for wired data communications, and 802.11 adapters for wireless data communications.

The arrangement of computers and other devices making up the exemplary system illustrated in FIG. 1 are for explanation, not for limitation. Data processing systems useful according to various embodiments of the present invention may include additional servers, routers, other devices, and peer-to-peer architectures, not shown in FIG. 1, as will occur to those of skill in the art. Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. Various embodiments of the present invention may be implemented on a variety of hardware platforms in addition to those illustrated in FIG. 1.

Figure 2:
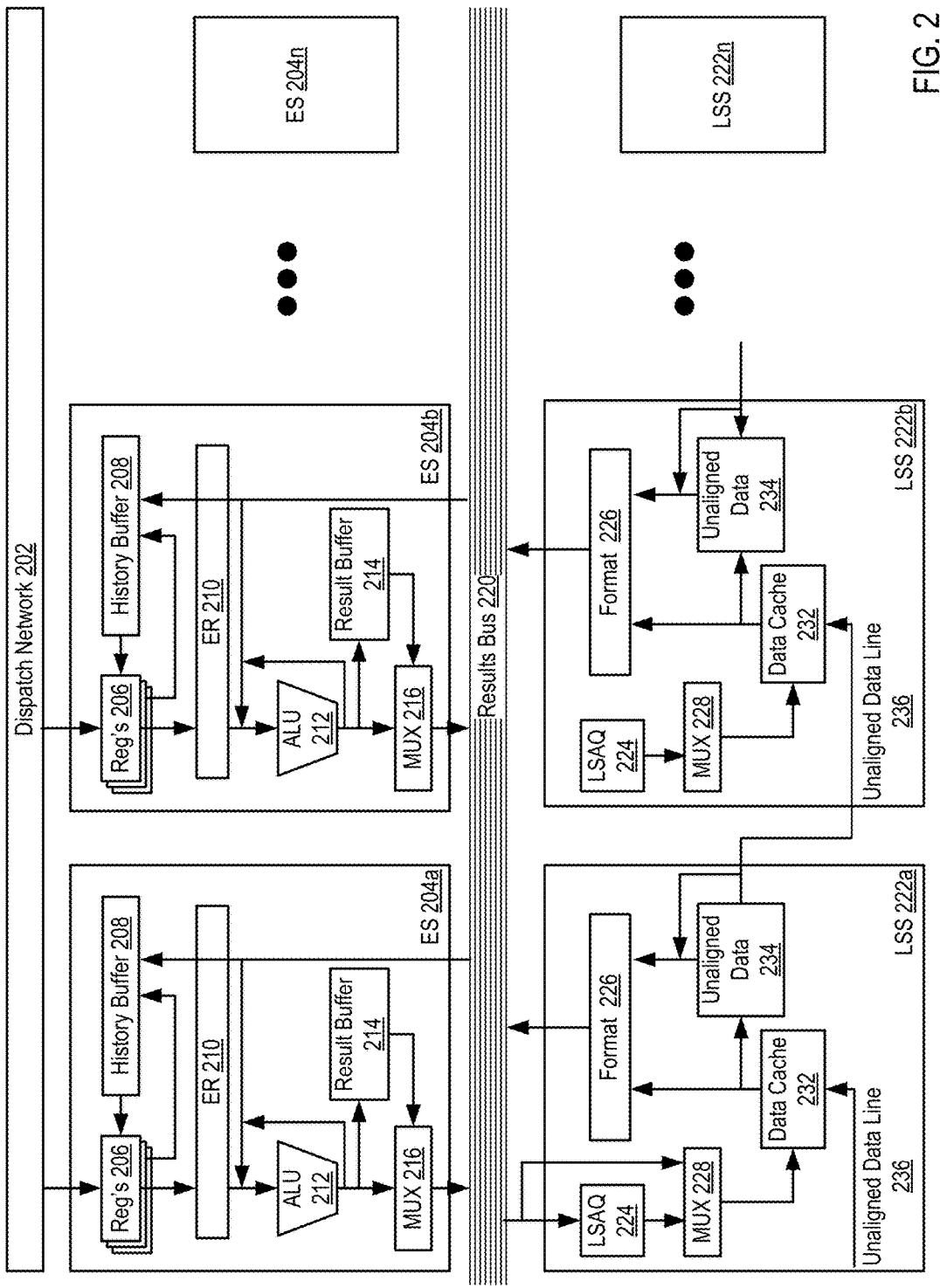
FIG. 2 sets forth an example system configured for using null IOPs to support even ITAG requirements in a multi-slice processor.

For further explanation, FIG. 2 sets forth a block diagram of a portion of a multi-slice processor according to embodiments of the present invention. The multi-slice processor in the example of FIG. 2 includes a dispatch network (202). The dispatch network (202) includes logic configured to dispatch instructions for execution among execution slices.

The multi-slice processor in the example of FIG. 2 also includes a number of execution slices (204a, 204b-204n). Each execution slice includes a general purpose register (GPR) (206) and a history buffer (208). The general purpose register and history buffer may sometimes be referred to as the mapping facility, as the registers are utilized for register renaming and support logical registers.

The general purpose register (206) is configured to store the youngest instruction targeting a particular logical register and the result of the execution of the instruction. A logical register is an abstraction of a physical register that enables out-of-order execution of instructions that target the same physical register.

When a younger instruction targeting the same particular logical register is received, the entry in the general purpose register is moved to the history buffer. The history buffer (208) may be configured to store many instructions targeting the same logical register. That is, the general purpose register is generally configured to store a single, youngest instruction for each logical register while the history buffer may store many, non-youngest instructions for each logical register.

Each execution slice (204) of the multi-slice processor of FIG. 2 also includes an execution reservation station (210). The execution reservation station (210) may be configured to issue instructions for execution. The execution reservation station (210) may include an issue queue. The issue queue may include an entry for each operand of an instruction. The execution reservation station may issue the operands for execution by an arithmetic logic unit or to a load slice (222a-222n) via the results bus (220).

The arithmetic logic unit depicted in the example of FIG. 2 may be composed of many components, such as add logic, multiply logic, floating point units, vector/scalar units, and so on. Once an arithmetic logic unit executes an operand, the result of the execution may be stored in the result buffer (214) or provided on the results bus (220) through a multiplexer (216).

The results bus may be configured in a variety of manners and be composed in a variety of sizes. In some instances, each execution slice may be configured to provide results on a single bus line of the results bus (220). In a similar manner, each load/store slice may be configured to provide results on a single bus line of the results bus (220). In such a configuration, a multi-slice processor with four processor slices may have a results bus with eight bus lines—four bus lines assigned to each of the four load/store slices and four bus lines assigned to each of the four execution slices. Each of the execution slices may be configured to snoop results on any of the bus lines of the results bus. In some embodiments, any instruction may be dispatched to a particular execution unit and then issued to any other slice for performance. As such, any of the execution slices may be coupled to all of the bus lines to receive results from any other slice. Further, each load/store slice may be coupled to each bus line in order to receive an issue load/store instruction from any of the execution slices. Readers of skill in the art will recognize that many different configurations of the results bus may be implemented.

The multi-slice processor in the example of FIG. 2 also includes a number of load/store slices (222a, 222b-222n). Each load/store slice includes a queue (224), a multiplexer (228), a data cache (232), unaligned data logic (234) and formatting logic (226). The queue receives load and store operations to be carried out by the load/store slice (222).

The unaligned data logic (234) of each slice is coupled to the unaligned data logic of another slice through the unaligned data line (236). The unaligned data logic (234) enables data to be stored and retrieved across multiple load/store slices. The formatting logic (226) formats data into a form that may be returned on the results bus (220) to an execution slice as a result of a load instruction.

Figure 3:
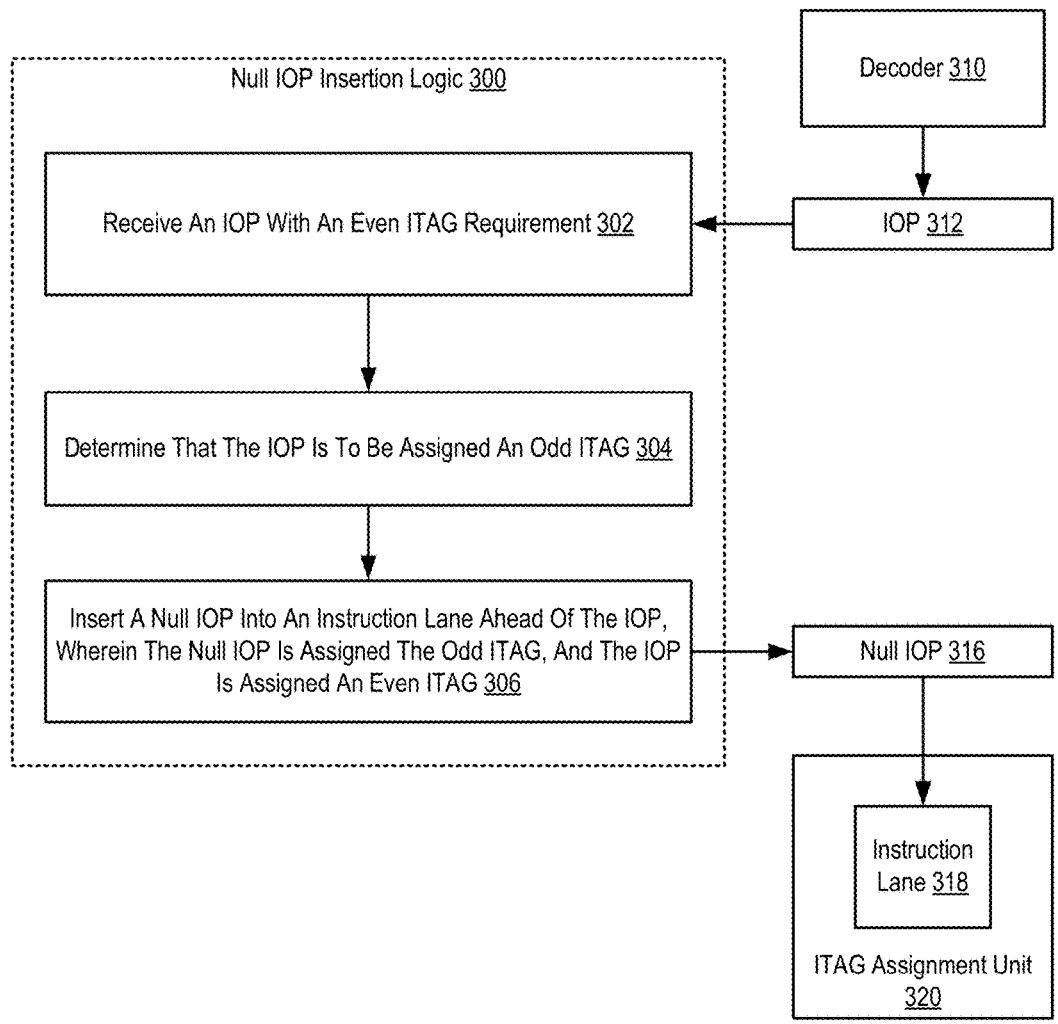
FIG. 3 sets forth a flow chart illustrating an exemplary method for using null IOPs to support even ITAG requirements in a multi-slice processor.

For further explanation, FIG. 3 sets forth a flow chart illustrating an exemplary method for using null internal operations (IOP)s to support even ITAG requirements in a multi-slice processor according to embodiments of the present invention. The method of FIG. 3 includes receiving (302) an IOP (312) with an even ITAG requirement. Receiving (302) an IOP (312) with an even ITAG requirement may be carried out by detecting, by the null IOP insertion logic (300), that the IOP (312) has been placed in the instruction lane (318). Receiving (302) an IOP (312) with an even ITAG requirement may be carried out by determining that an IOP placed in the instruction lane (318) is an IOP (312) with a companion IOP.

The IOP (312) with the even ITAG requirement is an internal operation decoded from a processor instruction. The processor instruction may be decoded into a number of IOPs. For example, an instruction may be decoded into a quad word and divided into two double word IOPs. Each of the double word IOPs may be sent to different execution slices, and one or both of the execution slices may need to refer to the IOP that corresponds to the IOP executing on the execution slice. The term companion IOP as used herein refers to an IOP that is decoded from the same instruction, and IOPs and companion IOPs that are part of the same instruction are referred to as being grouped together. The companion IOP may also be an IOP without an even ITAG requirement.

An ITAG is an instruction identifier. Each ITAG tracks an IOP from decode to completion. Each IOP may be assigned an ITAG by the ITAG assignment unit (320). The ITAG assignment unit (320) assigns ITAGs sequentially to IOPs in an instruction lane before the IOPs are transmitted to a dispatch unit. An ITAG may be implemented as a set of binary bits.

An even ITAG requirement is a characteristic of an IOP that instructs the instruction decode unit, ITAG assignment unit (320), and/or the null IOP insertion logic (300) that the ITAG assigned to the IOP must be even. An even ITAG requirement may be applied to an IOP that has one or more companion IOPs. The terms even and odd may refer specifically to the set of bits that makes up the ITAG, and whether the smallest bit is up or down (i.e., a '0' for even or '1' for odd). Alternatively, even may refer generally to any identifier that is the first in a sequence, and/or which provides a mechanism to calculate a corresponding odd identifier.

FIG. 3 also includes determining (304) that the IOP (312) is to be assigned an odd ITAG. Determining (304) that the IOP (312) is to be assigned an odd ITAG may be carried out by retrieving information about the IOPs in the instruction lane (318) and the current state of the ITAG assignment unit (320), such as whether the next-issued ITAG will be even or odd.

FIG. 3 also includes inserting (306) a null IOP (316) into an instruction lane (318) ahead of the IOP (312), wherein the null IOP (316) is assigned the odd ITAG, and the IOP (312) is assigned an even ITAG. Inserting (306) a null IOP (316) into an instruction lane (318) ahead of the IOP (312) may be carried out by generating a null IOP (316) and placing the null IOP (316) into the instruction lane (318) such that the null IOP (316) will be assigned the odd ITAG previously intended to be assigned to the IOP (312). Alternatively, the null IOP (316) and the IOP (312) may be inserted together in the instruction lane (318), with the IOP (312) inserted behind the null IOP (316). Further, the null IOP (316) may be inserted immediately before the IOP (312) in the instruction lane (318), or at any location in the instruction lane (318) ahead of the IOP (312), such as the first location of the instruction lane (318).

For example, the IOP (312) may be third in line to be assigned an ITAG, and the null IOP insertion logic (300) may have determined that the third IOP in line will be assigned an odd ITAG. The null IOP insertion logic (300) may then insert a null IOP (316) in front of the IOP (312) in the instruction lane (318). The null IOP (316) will then be the third in line and will be assigned the odd ITAG, and the IOP (312), now forth in line, will be assigned an even ITAG.

The null IOP (316) may be generated by the null IOP insertion logic (300) by generating an IOP that causes the execution slice to complete the IOP performing little or no processing. Specifically, the null IOP (316) may be generated with instructions that cause the execution slice to send the null IOP (316) directly to the completion unit without any further processing. The null IOP insertion logic (300) may be part of the decoder (310) and/or part of an instruction decode unit.

Figure 4:
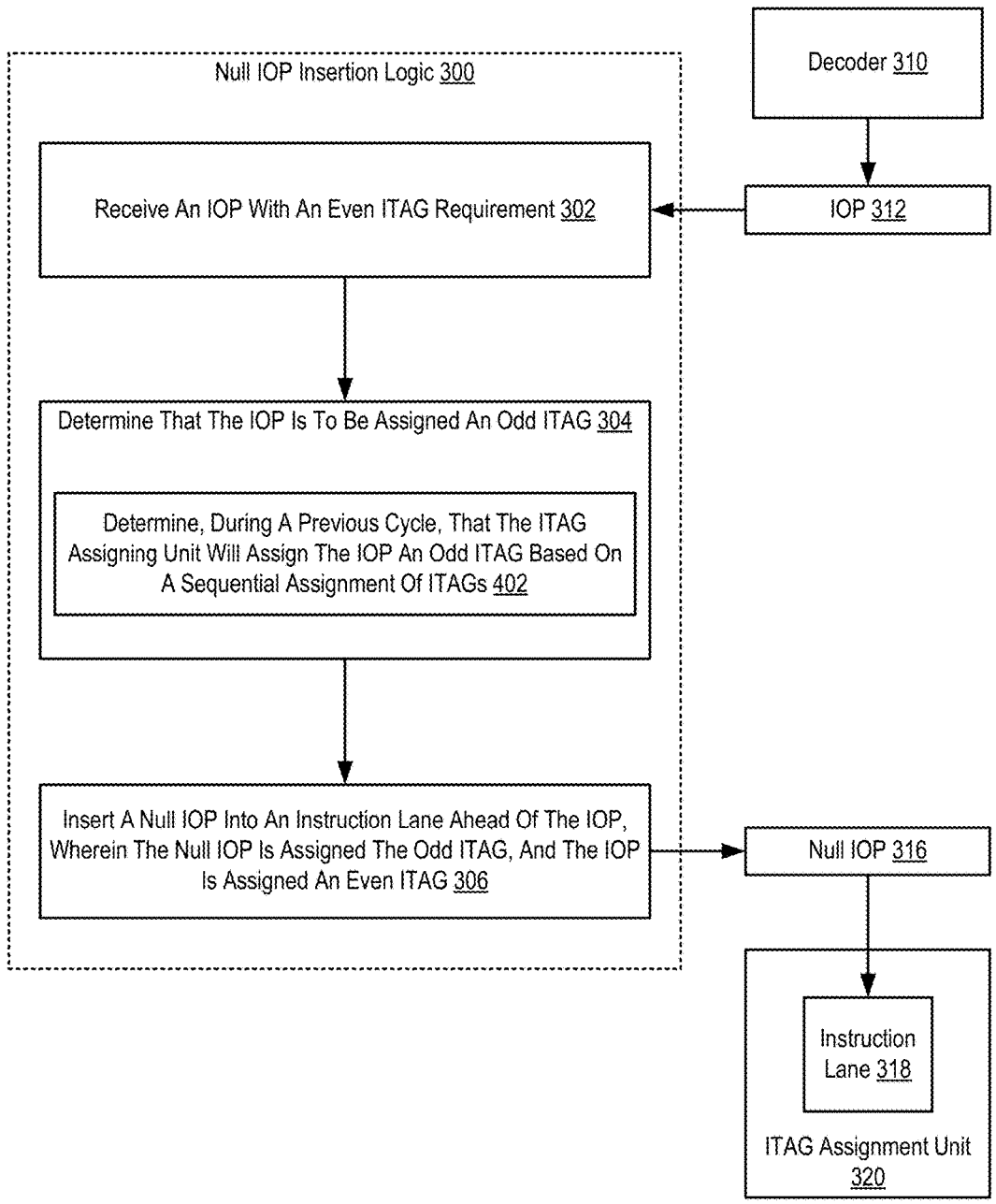
FIG. 4 sets forth a flow chart illustrating an exemplary method for using null IOPs to support even ITAG requirements in a multi-slice processor.

For further explanation, FIG. 4 sets forth a flow chart illustrating a further exemplary method for using null IOPs to support even ITAG requirements in a multi-slice processor according to embodiments of the present invention that includes receiving (302) an IOP (312) with an even ITAG requirement; determining (304) that the IOP (312) is to be assigned an odd ITAG; and inserting (306) a null IOP (316) into an instruction lane (318) ahead of the IOP (312), wherein the null IOP (316) is assigned the odd ITAG, and the IOP (312) is assigned an even ITAG.

The method of FIG. 4 differs from the method of FIG. 3, however, in that determining (304) that the IOP (312) is to be assigned an odd ITAG includes determining (402), during a previous cycle, that the ITAG assigning unit (320) will assign the IOP (312) an odd ITAG based on a sequential assignment of ITAGs. Determining (402), during a previous cycle, that the ITAG assigning unit (320) will assign the IOP (312) an odd ITAG based on a sequential assignment of ITAGs may be carried out by identifying, during the previous cycle, the number if IOPs transmitted to the issue unit, and determining whether the next ITAG to be issued will be even or odd. Using the number of IOPs transmitted during the previous cycle, whether the next issued ITAG will be even or odd, and the current location of the IOP (312) in the instruction lane (318) for the next cycle, the null IOP insertion logic (300) determines whether the IOP (312) is to be issued an even ITAG or an odd ITAG.

For example, the null IOP insertion logic (300) may identify the number of IOPs transmitted to the issue unit to be 3, and determine that the next ITAG to be issued will be even. The null IOP insertion logic (300) may then determine that the IOP (312) is the first IOP in the instruction lane (318) for the next cycle, and will therefore be issued an odd ITAG.

Figure 5:
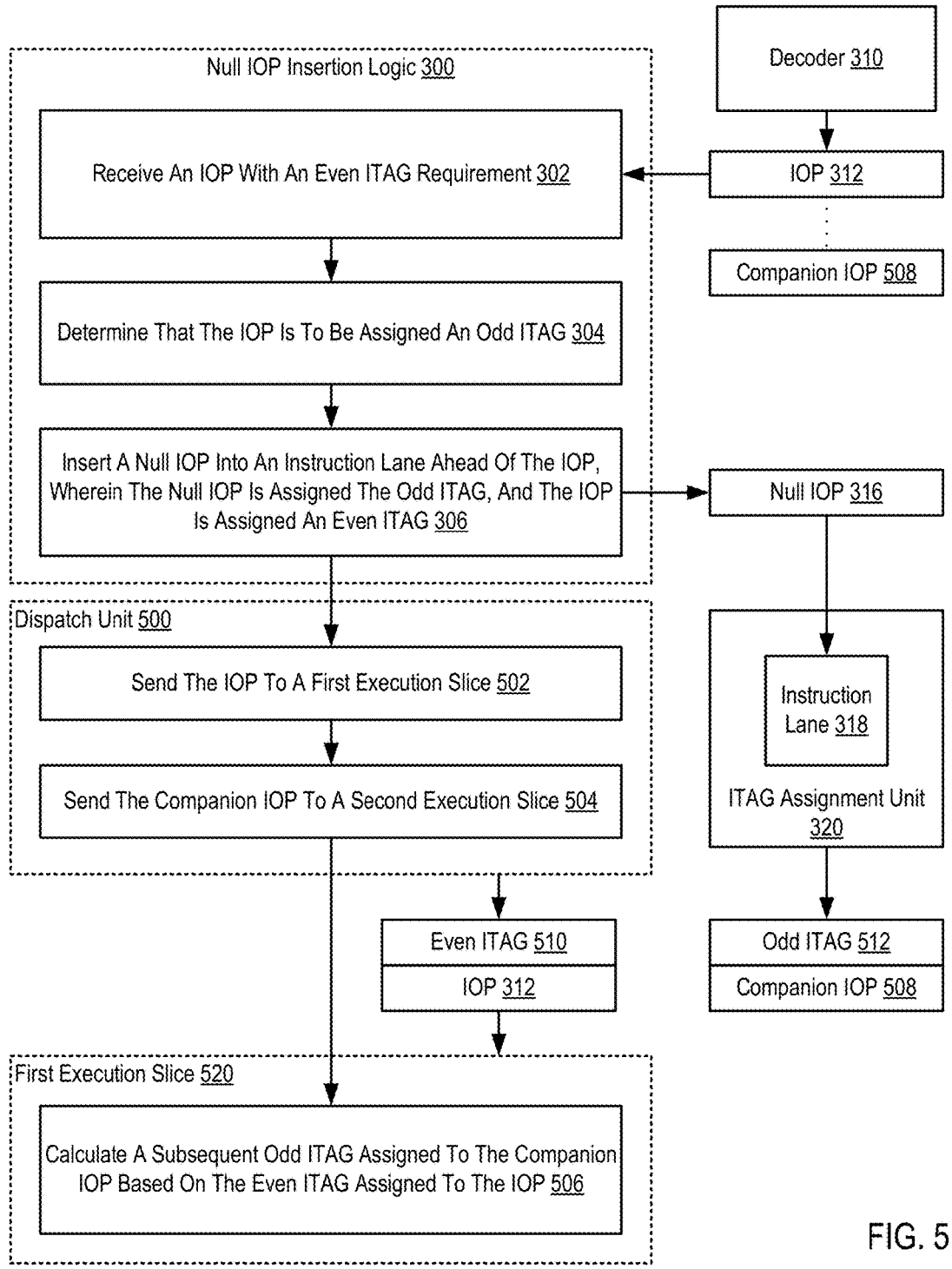
FIG. 5 sets forth a flow chart illustrating an exemplary method for using null IOPs to support even ITAG requirements in a multi-slice processor.

For further explanation, FIG. 5 sets forth a flow chart illustrating a further exemplary method for using null IOPs to support even ITAG requirements in a multi-slice processor according to embodiments of the present invention that includes receiving (302) an IOP (312) with an even ITAG requirement; determining (304) that the IOP (312) is to be assigned an odd ITAG; and inserting (306) a null IOP (316) into an instruction lane (318) ahead of the IOP (312), wherein the null IOP (316) is assigned the odd ITAG, and the IOP (312) is assigned an even ITAG (510).

The method of FIG. 5 differs from the method of FIG. 3, however, in that FIG. 5 further includes sending (502) the IOP (312) to a first execution slice (300); sending (504) the companion IOP (508) to a second execution slice; and calculating (506) a subsequent odd ITAG (512) assigned to the companion IOP (508) based on the even ITAG (510) assigned to the IOP (312).

As discussed above, the IOP (312) with the even ITAG requirement may be grouped with a companion IOP (508). The companion IOP (508) may be placed in the instruction lane (318) immediately behind the IOP (312). Consequently, the companion IOP (508) is assigned the next sequential ITAG to the ITAG assigned to the IOP (312). Because the IOP (312) is assigned an even ITAG, the companion IOP (508) is assigned an odd ITAG (or subsequent odd ITAG relative to the odd ITAG assigned to the null IOP (316)).

Sending (502) the IOP (312) to a first execution slice (300) may be carried out by transmitting the IOP (312) with the even ITAG (510) to the dispatch unit (500). The dispatch unit (500) may then send the IOP (312) with the even ITAG (510) to a first execution slice (520) for processing.

Sending (504) the companion IOP (508) to a second execution slice may be carried out by transmitting the companion IOP (508) with the odd ITAG (512) to the dispatch unit (500). The dispatch unit (500) may then send the companion IOP (508) with the odd ITAG (512) to a second execution slice for processing. Because the IOP (312) and the companion IOP (508) are two parts of a single instruction, they will each be sent to different corresponding execution slices for processing.

Because the IOP (312) has been assigned an even ITAG, and the companion IOP (506) has been assigned the next sequential odd ITAG, calculating the ITAG of either IOP given one of the IOPs may be performed efficiently. Calculating (506) a subsequent odd ITAG (512) assigned to the companion IOP (508) based on the even ITAG (510) assigned to the IOP (312) may be carried out by performing an operation on the even ITAG (510). For example, an exclusive or (XOR) operation may be performed using a single up bit (i.e., '1') and the last bit of an even ITAG made up of binary bits to obtain the corresponding odd ITAG. The same operation may be performed on the odd ITAG to obtain the corresponding even ITAG.

Figure 6:
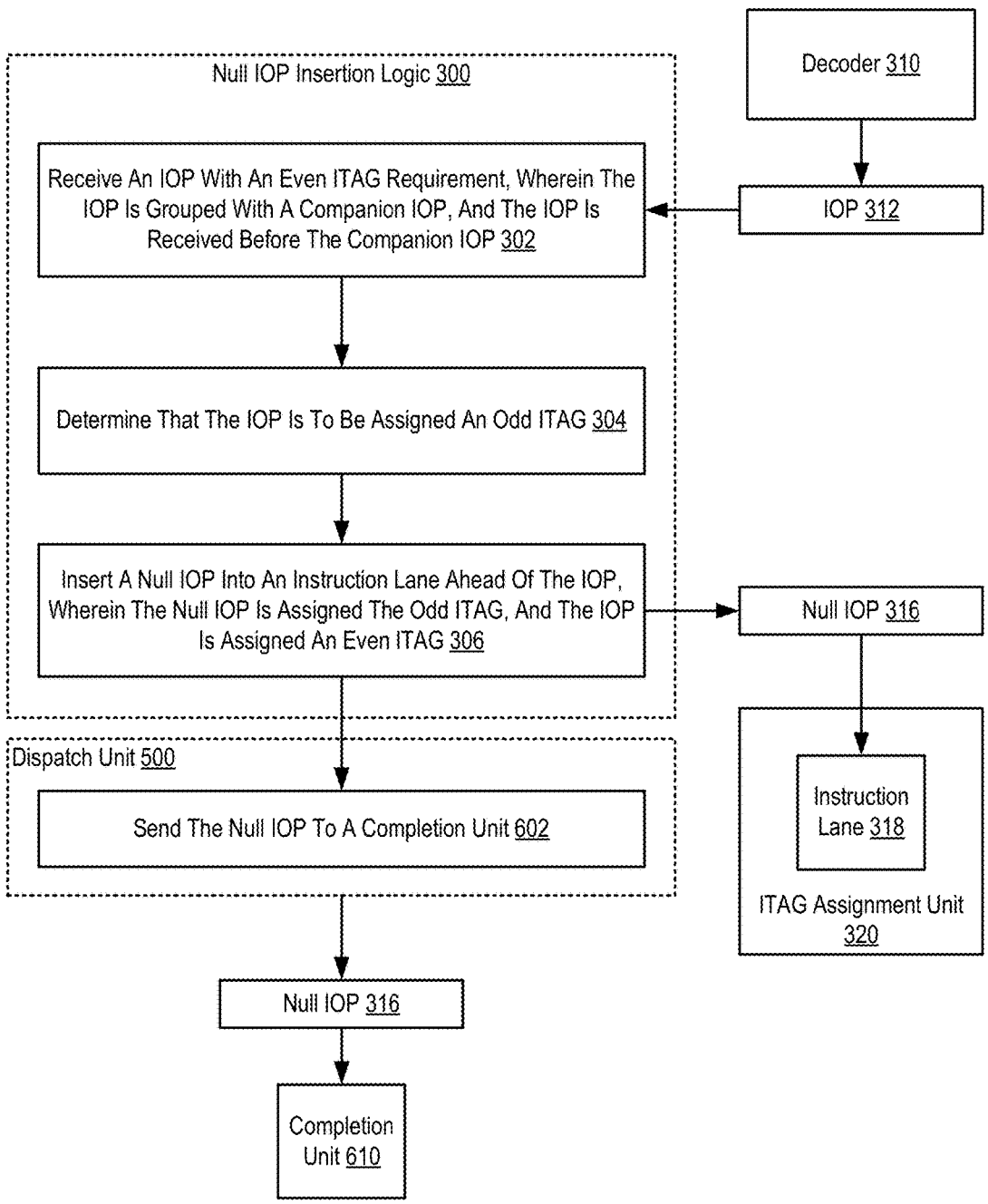
FIG. 6 sets forth a flow chart illustrating an exemplary method for using null IOPs to support even ITAG requirements in a multi-slice processor.

For further explanation, FIG. 6 sets forth a flow chart illustrating a further exemplary method for using null IOPs to support even ITAG requirements in a multi-slice processor according to embodiments of the present invention that includes receiving (302) an IOP (312) with an even ITAG requirement; determining (304) that the IOP (312) is to be assigned an odd ITAG; and inserting (306) a null IOP (316) into an instruction lane (318) ahead of the IOP (312), wherein the null IOP (316) is assigned the odd ITAG, and the IOP (312) is assigned an even ITAG.

The method of FIG. 6 differs from the method of FIG. 3, however, in that FIG. 6 further includes sending (602) the null IOP (316) to a completion unit (610). Sending (602) the null IOP (316) to a completion unit (610) may be carried out by dispatching the null IOP (316) directly to the completion unit (610) and marking the null IOP (316) as completed.

Exemplary embodiments of the present invention are described largely in the context of a fully functional computer system for using null IOPs to support even ITAG requirements in a multi-slice processor. Readers of skill in the art will recognize, however, that the present invention also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the exemplary embodiments described in this specification are oriented to software installed and executing on computer hardware, nevertheless, alternative embodiments implemented as firmware or as hardware are well within the scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method for supporting even instruction tag ('ITAG') requirements with null internal operations (IOPs), the method comprising:
    receiving an IOP with an even ITAG requirement, wherein the even ITAG requirement is a requirement that the IOP is assigned an even ITAG;
    determining that the IOP is to be assigned an odd ITAG; and
    inserting a null IOP into an instruction lane ahead of the IOP, wherein the null IOP is assigned the odd ITAG, and the IOP is assigned an even ITAG.

2. The method of claim 1 wherein determining that the IOP is to be assigned an odd ITAG comprises:
    determining, during a previous cycle, that the ITAG assigning unit will assign the IOP an odd ITAG based on a sequential assignment of ITAGs.

3. The method of claim 1 wherein the IOP is grouped with a companion IOP, and the IOP is received before the companion IOP, and wherein the companion IOP is assigned a subsequent odd ITAG.

4. The method of claim 3 further comprising:
sending the IOP to a first execution slice; and
sending the companion IOP to a second execution slice.

5. The method of claim 4 wherein the first execution slice calculates a subsequent odd ITAG assigned to the companion IOP based on the even ITAG assigned to the IOP.

6. The method of claim 3 wherein the IOP and the companion IOP are each part of a single instruction.

7. The method of claim 1 further comprising:
sending the null IOP to a completion unit.

8. A multi-slice computer processor for supporting even instruction tag ('ITAG') requirements with null internal operations (IOPs), the multi-slice computer processor comprising null IOP insertion logic configured to carry out the steps of:
receiving an IOP with an even ITAG requirement, wherein the even ITAG requirement is a requirement that the IOP is assigned an even ITAG;
determining that the IOP is to be assigned an odd ITAG; and
inserting a null IOP into an instruction lane ahead of the IOP, wherein the null IOP is assigned the odd ITAG, and the IOP is assigned an even ITAG.

9. The multi-slice computer processor of claim 8 wherein determining that the IOP is to be assigned an odd ITAG comprises:
determining, during a previous cycle, that the ITAG assigning unit will assign the IOP an odd ITAG based on a sequential assignment of ITAGs.

10. The multi-slice computer processor of claim 8 wherein the IOP is grouped with a companion IOP, and the IOP is received before the companion IOP, and wherein the companion IOP is assigned a subsequent odd ITAG.

11. The multi-slice computer processor of claim 10 further configured for:
sending the IOP to a first execution slice; and
sending the companion IOP to a second execution slice.

12. The multi-slice computer processor of claim 11 wherein the first execution slice calculates a subsequent odd ITAG assigned to the companion IOP based on the even ITAG assigned to the IOP.

13. The multi-slice computer processor of claim 10 wherein the IOP and the companion IOP are each part of a single instruction.

14. The multi-slice computer processor of claim 8 further configured for:
sending the null IOP to a completion unit.

15. A computing system including a multi-slice computer processor configured for supporting even instruction tag ('ITAG') requirements with null internal operations (IOPs), the multi-slice computer processor comprising null IOP insertion logic configured to carry out the steps of:
receiving an IOP with an even ITAG requirement, wherein the even ITAG requirement is a requirement that the IOP is assigned an even ITAG;
determining that the IOP is to be assigned an odd ITAG; and
inserting a null IOP into an instruction lane ahead of the IOP, wherein the null IOP is assigned the odd ITAG, and the IOP is assigned an even ITAG.

16. The computing system of claim 15 wherein determining that the IOP is to be assigned an odd ITAG comprises:
determining, during a previous cycle, that the ITAG assigning unit will assign the IOP an odd ITAG based on a sequential assignment of ITAGs.

17. The computing system of claim 15 wherein the IOP is grouped with a companion IOP, and the IOP is received before the companion IOP, and wherein the companion IOP is assigned a subsequent odd ITAG.

18. The computing system of claim 17, wherein the multi-slice computer processor further configured to carry out:
sending the IOP to a first execution slice; and
sending the companion IOP to a second execution slice.

19. The computing system of claim 18 wherein the first execution slice calculates a subsequent odd ITAG assigned to the companion IOP based on the even ITAG assigned to the IOP.

20. The computing system of claim 15, wherein the multi-slice computer processor further configured to carry out:
sending the null TOP to a completion unit.

* * * * *